June 1, 1965     E. J. DETTLING     3,186,331

CHARCOAL GRILLS

Filed April 10, 1962

INVENTOR.
Edwin J. Dettling
BY William B. Jaspert
Attorney.

United States Patent Office 3,186,331
Patented June 1, 1965

3,186,331
CHARCOAL GRILLS
Edwin J. Dettling, 271 Banbury Lane, Pittsburgh, Pa.
Filed Apr. 10, 1962, Ser. No. 186,535
2 Claims. (Cl. 99—445)

This invention relates to new and useful improvements in barbecue grills for outdoor cookery in which the food to be cooked is supported above or below a heat flame or charcoal and it is among the objects of this invention to provide a grill consisting of parallel bars for supporting food which are designed to prevent the dripping of the melted food juices into the charcoal bed or fire beneath the grill.

It is a further object of the invention to provide a grill comprising a plurality of uniformly spaced parallel flat strips of refractory material such as stainless steel in which the edges of the strip are turned in opposite directions with the turned down upper edges overlapping the turned up lower edges to constitute the latter troughs for catching drippings from the food supported thereon.

Another object of the invention is the provision of supporting bars in the form of superposed flat strips having asbestos disposed therebetween to eliminate the formation of hot spots throughout the grill.

Still another object of the invention is the provision of a grill having tilted flat strips as hereinbefore set forth, with cross supporting members of different height to cause the strips to be inclined in the direction of a grease receptacle.

These and other objects of the invention will become more apparent from a consideration of the accompanying drawing constituting a part hereof in which like reference characters designate like parts and in which.

Figure 1:
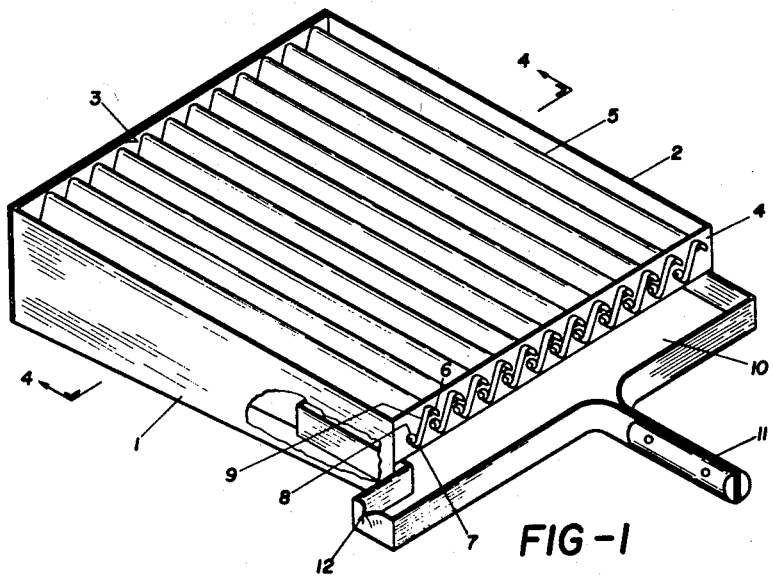
FIGURE 1 is a view in perspective of a barbecue grill embodying the principles of this invention.
Figure 2:
FIGURE 2 is a longitudinal section.
Figure 3:
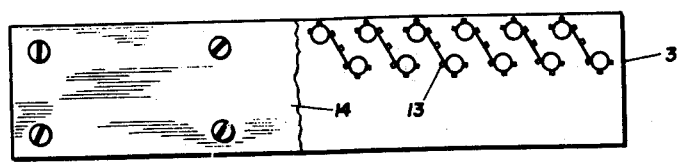
Figure 4:
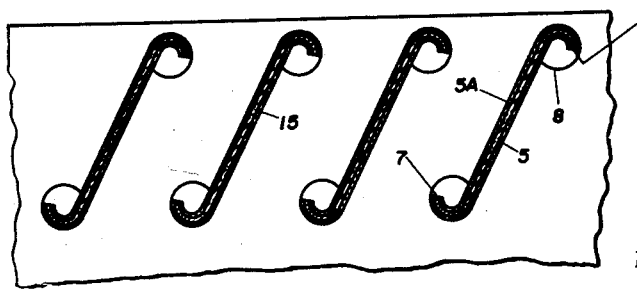

FIGURE 3 a rear view with the end plate partially removed; and,

FIGURE 4 a partial cross section taken along the line 4—4, FIGURE 1.

With reference to the several figures of the drawing, the numerals 1 and 2 constitute flanged side walls of a grill and the numerals 3 and 4 the rear and front wall, respectively. Secured to the walls 3 and 4 and disposed between the side walls 1 and 2 are a plurality of bars 5. They are substantialy S-shaped and are mounted in an inclined position. The side edges of the strips 5 are bent over, the upper edges 6 being turned down and the lower edges 7 being turned up so that the turned down edges 6 overlap the upturned edges 7 of adjacent strips.

The turned ends 6 and 7 of the bars are radial so that they will fit into drilled holes 8 in the rear and front walls 3 and 4 and extend through slots 9 provided in said walls. As shown in FIGURE 1, the bars 5 project forward of the front plate or wall 4 about three-fourths of an inch and overlap a drip pan 10 having a handle portion 11 and a pouring lip 12, the pan being slidable into the space beneath the parallel bars 5, as shown by the cut away portion in FIGURE 1 of the drawing.

The rear of the grill bars 5 are shown as extending through the rear wall and having cutout portions 13 bent over in opposite directions, as shown in FIGURE 3, this construction being covered by a cover plate 14, FIGURE 3. In FIGURE 4, the plate is shown with the drill holes 8 for receiving the turned up and turned down portions 7 and 6, respectively, of the bars 5. Also, as shown in FIGURE 4, the flat portion of the bars are tilted to a degree that the upper turned down portion 6 overlaps the trough-shaped turned up portion 7 so that any drippings from the meat will fall into the trough 7 and because of the inclination of the bars 5, will drip into the drip pan 10, thus avoiding dripping onto the fire such as the charcoal beneath the grill.

As shown in FIGURE 4, asbestos may be packed in between a pair of sheet metal strips, the asbestos being designated by the numeral 15. This accomplishes a more even distribution of heat throughout the length of the grill bars to prevent burning of any portion of the food being cooked thereon.

It is evident from the foregoing description of the invention that by constructing the bars out of stainless steel strip bent at their edges, the grill provides a maximum opening for the passage of the products of combustion from the charcoal or fire therebeneath, yet preventing the dripping of juices onto the fire which would cause soot. Also by means of the S shape of the grill bars, the juices are conducted off through the front plate into a drip pan from which they can be poured by simply removing the pan and tilting the same.

Although one embodiment of the invention has been herein illustrated and described, it will be evident to those skilled in the art that various modifications may be made in the details of construction without departing from the principles herein set forth.

I claim:
1. A grill for supporting food exposed to cooking temperatures comprising a plurality of parallel strips having frames for supporting the ends thereof, said strips consisting of double sheets of stainless steel separated by asbestos disposed therebetween to prevent hot spots throughout the length of the strips, said strips having their juxtaposed edges turned in opposite directions with the upper edges turned down and the lower edges turned up, the flat body portion of the strips being disposed at an angle to have the upper turned down portions overlap the lower upturned portions to allow the juices released from the food to accumulate in said upturned portions, said strips being inclined to constitute the upturned portions troughs to run off said juices at one end.

2. A grill as set forth in claim 1 in which the strips are of substantially S shape having flat body portions and cylindrically curved ends and in which the frames supporting the ends of the strips are slotted and drilled to receive the flat body portions and cylindrical curved ends of the strips.

References Cited by the Examiner
UNITED STATES PATENTS

| 176,819 | 5/76 | Thomas | 99—445 |
|---|---|---|---|
| 2,060,004 | 11/36 | Ebberts | 99—446 |
| 2,626,559 | 1/53 | Rau | 99—446 X |
| 2,724,875 | 11/55 | McKinley. | |

FOREIGN PATENTS

| 1,102,539 | 3/61 | Germany. |
|---|---|---|
| 135,840 | 6/20 | Great Britain. |

ROBERT E. PULFREY, *Primary Examiner.*

JEROME SCHNALL, LEONARD W. VARNER,
*Examiners.*